US005263756A

United States Patent [19]

Gaspar

[11] Patent Number: 5,263,756

[45] Date of Patent: Nov. 23, 1993

[54] ADVERTISING VEHICLE

[76] Inventor: Carlos L. Gaspar, Don Jaime I, No. 34 duplic., 50001 Zaragoza, Spain

[21] Appl. No.: 990,434

[22] Filed: Dec. 15, 1992

[30] Foreign Application Priority Data

Jul. 22, 1992 [ES] Spain .................................. 9202296

[51] Int. Cl.[5] ............................................... B60P 3/18

[52] U.S. Cl. ...................................... 296/21; 296/24.1

[58] Field of Search ................................ 296/21, 24.1

[56] References Cited

U.S. PATENT DOCUMENTS 4,701,627 10/1987 Gamfuti et al. ....................... 296/21

FOREIGN PATENT DOCUMENTS 3243730 5/1984 Fed. Rep. of Germany ........ 296/21

3642774 6/1988 Fed. Rep. of Germany ........ 296/21

2620983 3/1989 France ................................ 296/21

68435 3/1988 Japan .................................... 296/21

*Primary Examiner*—Robert R. Song

*Attorney, Agent, or Firm*—Ostrolenk, Faber, Gerb & Soffen

[57] ABSTRACT

An advertising vehicle has two opposite, outwardly facing spaced apart walls of televison screens. An A-C generator powers them. An air conditioner between the walls cools the television equipment. A control board controls the televisions. A televions monitor shows the pictures on both televison walls.

7 Claims, 2 Drawing Sheets

ADVERTISING VEHICLE

BACKGROUND AND SUMMARY OF THE INVENTION

The present invention concerns an advertising vehicle which represents an improvement over the present state of the art.

The invention concerns a vehicle, such as a truck or trailer with an incorporated electric generator and including a box of special design. The sides of the box comprise two walls of televisions. Between the walls there is an empty space intended to receive an installed air conditioner to provide cooling for the two batteries of television located on the walls.

The engine of the vehicle is provided with a special electric generator to supply electric current to each of the sets of multiple television screens which form each wall when they are mounted on a truck. An independent trailer to be drawn by a truck has incorporated in it an independent generator which is also located in the inner empty space between its two walls.

The cab of the truck has a digital unit for displaying a single image and has video control equipment which controls the amplified picture advertising which appears on both giant screens of the said two television walls.

Other objects, features and advantages of the present invention are explained with reference to the accompanying drawings.

BRIEF DESCRIPTION OF THE DRAWINGS

The drawings illustrate one practical embodiment of the invention for illustration and therefore are without any limiting character.

DETAILED DESCRIPTION OF THE INVENTION

Figure 1:
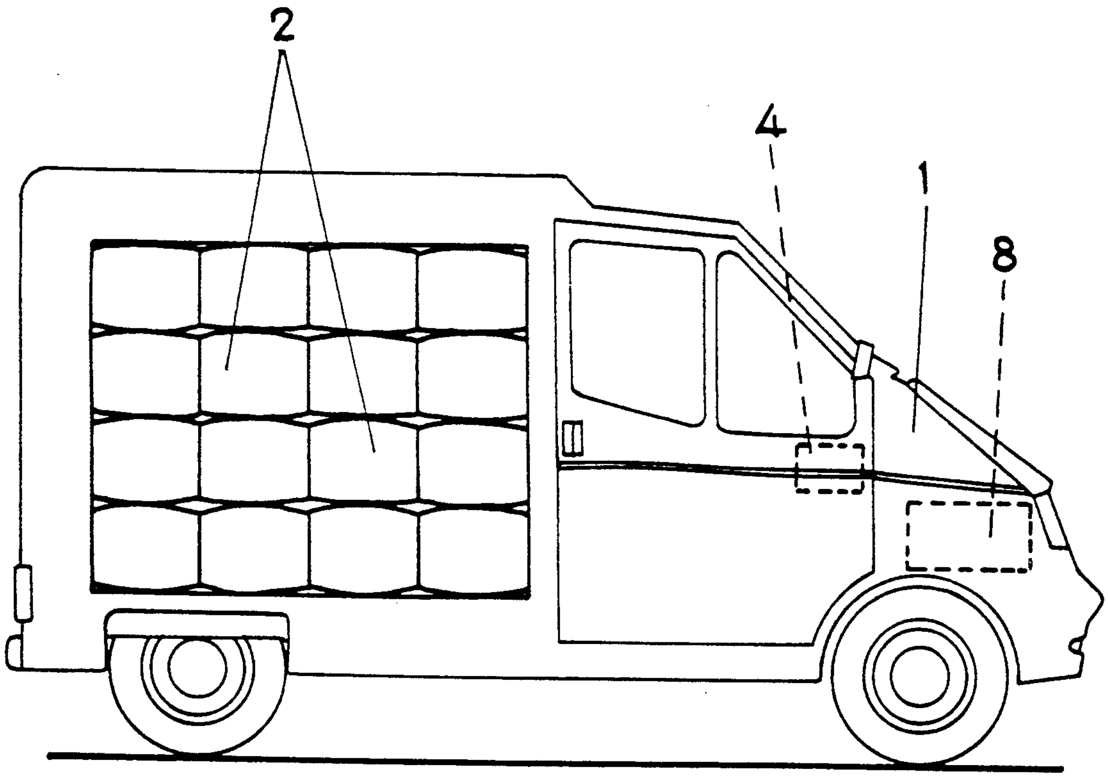
FIG. 1 is a side view of the vehicle of the invention.
Figure 2:
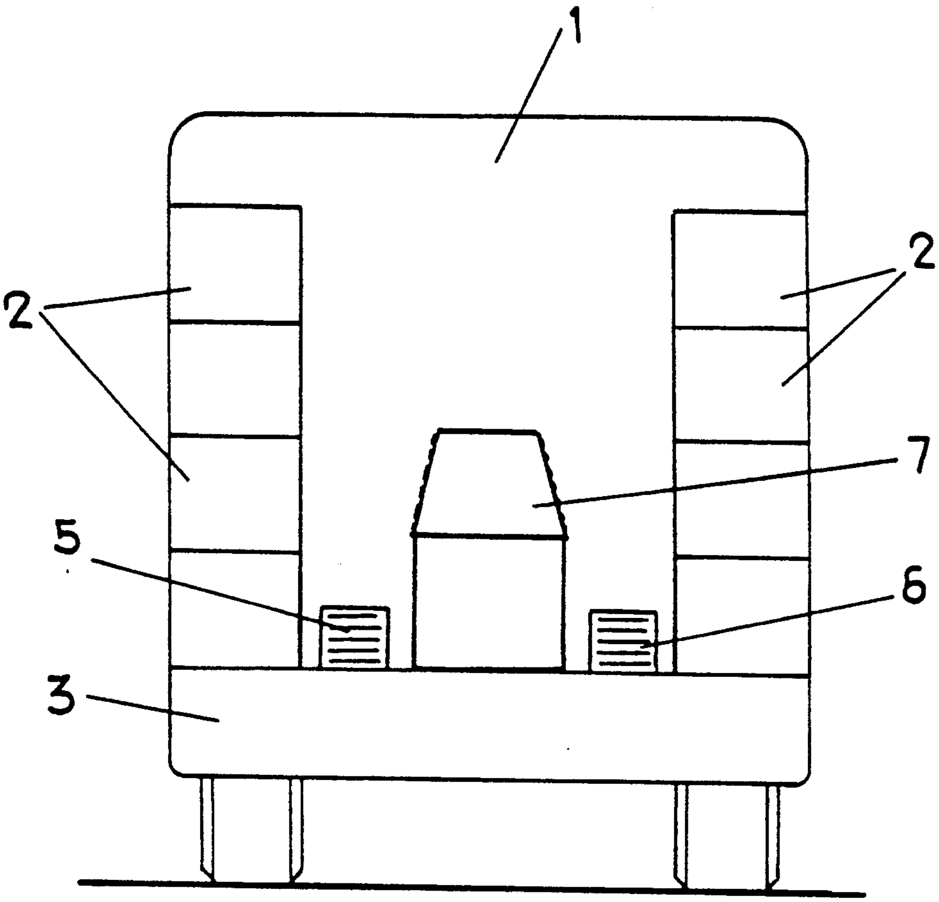
FIG. 2 is a diagrammatic view of the interior, looking at the vehicle from the rear.

A vehicle for advertising purposes comprises a truck or trailer (1) which includes a box that is formed and defined by two sides together defining two television walls (2) or video walls which face outwardly and are visible from both sides of the vehicle. Each wall is formed of a variable number of television screens contained in a set of racks and inner structures. The truck or trailer includes rear supports (3) for electronic equipment and includes a general electrical installation. It has a control board (4) which is provided with measurement and protection devices, with differentials, fuses, etc. It has a single-phase transformer (5) for the equipment and has another second transformer (6) for an air conditioner (7). These are all supplemented with an alternating current generator (8). For a truck, the generator is located on the engine. For a trailer, that generator is located within the box of the trailer.

In addition to the control board (4), the apparatus comprises master and double output cards, wired for the two video walls and a monitor adapted in order to show the same picture simultaneously on both TV walls. As all of the foregoing electric elements individually are of known types, the details of each and means interconnecting them need not be shown and described. Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An advertising vehicle, comprising:
   - a body which is box shaped and includes sides which are formed by racks;
   - two batteries of televisions mounted on the racks to form two spaced apart, outwardly facing video walls, each wall having television screens;
   - an alternating electric current generator for powering the televisions;
   - an air conditioner positioned for maintaining the televisions at operating temperature;
   - a control board including measurement and protection devices for the video walls; a single-phase transformer for feeding the devices on the board;
   - an independent transformer for the air conditioner; and
   - a television monitor including means adapted for simultaneously showing the same picture on both television walls.

2. The advertising vehicle of claim 1, wherein the vehicle has an engine and the electric current generator is connected on the engine of the vehicle.

3. The advertising vehicle of claim 1, wherein the vehicle is a trailer, and the electric current generator is connected on the chassis of the trailer.

4. The advertising vehicle of claim 1, wherein the generator is located between the two batteries of television screens which form the video walls.

5. The advertising vehicle of claim 1, wherein the air conditioner is mounted on the body of the vehicle within the inner space formed in the box shape of the vehicle between the two video walls.

6. The advertising vehicle of claim 1, wherein the vehicle has a cab and the control board is mounted in the cab of the vehicle.

7. The advertising vehicle of claim 2, wherein the control board is comprised of digital equipment and the monitor includes an adapter for simultaneously showing the same picture on the televisions of both television video walls.

* * * * *